United States Patent [19]

Futsuhara

[11] Patent Number: 4,661,880
[45] Date of Patent: Apr. 28, 1987

[54] FAILSAFE MONITORING SYSTEM WITH INPUT CONTROLLED SWITCH CIRCUITS

[75] Inventor: Koichi Futsuhara, Omiya, Japan
[73] Assignee: Nippon Signal Co., Ltd., Japan
[21] Appl. No.: 726,885
[22] Filed: Apr. 24, 1985
[30] Foreign Application Priority Data

Apr. 25, 1984 [JP] Japan .................................. 59-83529

[51] Int. Cl.$^4$ ................................................ H02H 7/10
[52] U.S. Cl. ........................................ 361/93; 361/87; 361/101
[58] Field of Search .............................. 361/87, 93, 101

[56] References Cited

U.S. PATENT DOCUMENTS

| | | | |
|---|---|---|---|
| 3,735,203 | 5/1973 | Fujie et al. | 361/87 |
| 3,934,940 | 1/1976 | Schnaibel | 361/93 X |
| 4,486,802 | 12/1984 | Claussen | 361/101 X |
| 4,509,102 | 4/1985 | Ayer | 361/101 X |
| 4,540,939 | 9/1985 | Osborne | 361/87 X |
| 4,555,742 | 11/1985 | Gray et al. | 361/101 X |

FOREIGN PATENT DOCUMENTS 57-4764 11/1982 Japan .

Primary Examiner—A. D. Pellinen
Assistant Examiner—A. Jonathan Wysocki
Attorney, Agent, or Firm—Lowe, Price, Leblanc, Becker & Shur

[57] ABSTRACT

According to the load-driving switch circuit monitoring system of the present invention, on-off control of a switch circuit connected to in a circuit in series for driving an electric load is performed according to a fail-safe input signal Si, and conduction or non-conduction of the switch circuit is detected based on a load current in the driving circuit. An input signal converter and a load current signal converter, each of which puts out two different voltage values according to the input signal and load current detection signal and a signal of a problem of the converters per se, are arranged. A monitor signal generator is disposed to monitor only the normal correspondence relation (S) between the input signal Si and load current in the normal function state of the switch circuit among said three outputs generated by each converter. This monitor signal generator generates a high voltage output only when this normal correspondence relation (S) is detected, and when the correspondence relation is not normal or when a problem takes place in the input signal converter or the load current signal converter, the monitor signal generator generates a low voltage output, whereby malfunction of the load by the problem in the switch circuit and both the converters is monitored.

9 Claims, 6 Drawing Figures

FAILSAFE MONITORING SYSTEM WITH INPUT CONTROLLED SWITCH CIRCUITS

FIELD OF THE INVENTION

The present invention relates to a monitoring system for load-driving switch circuits which are used for driving loads with a high fail-safe effect in railways or other fields. More specifically, the present invention relates to a monitoring system excellent in the fail-safe property, in which a switch circuit for driving a load can be directly controlled by an input signal.

BACKGROUND OF THE INVENTION

In railways or press-controlling fields where a high fail-safe characteristic is required, it is indispensable to use an apparatus or equipment having such a fail-safe property that when a short circuit, a breaking or the like takes place the circuit is switched over to the safe side without fail. Therefore, when a load which is a final object to be controlled, for example, a motor or a relay, is driven, the fail-safe characteristic is similarly required.

If a switch circuit for driving a load is directly controlled by an input signal in view of this fail-safe property, a trouble in the switch circuit results in malfunction of the load. Therefore, according to the conventional technique, the load cannot be directly controlled by an input signal, and a signal-receiving system has to be interposed between the input signal, and the load so as to maintain the fall-safe effect. For example, in a conventional load-driving switch circuit, in order to ensure maintenance of the fail-safe effect, there is provided a direct current relay having a silver-carbon type contact, in which a fusion trouble seldom occurs, including a signal-receiving circuit comprising an amplifier, a transformer and a rectifying circuit interposed between this direct current relay and an input terminal for a control signal to amplify an alternating current signal Si applied to the input terminal through the transformer. The amplified signal is supplied to the rectifying circuit to convert it to a direct current signal, and the direct current relay is excited by the converted direct current signal to drive the load indirectly through this contact.

Thus, in the conventional load-driving switch circuit, the fail-safe effect is attained by utilizing the transformer-connected amplifier (amplification by an alternating current operation) and the direct current relay. According to this method, however, it is impossible to control the load directly by an input signal. Furthermore, since a transistor constituting the signal-receiving transistor is used in an unsaturated region because of its function, the circuit efficiency is low, and moreover, the structure between the input signal and the load is complicated and the connection has to be effected through a relay contact.

Furthermore, it is known that a relay is used for a safety apparatus used in the field of pressing machines. This safety apparatus is constructed so that when a hand of an operator is placed on a bolster plate, a slide is inhibited from falling down, and the relay is used for detecting an output of a sensor of the safety apparatus (the sensor detects the presence of the operator's hand on the bolster plate or in the vicinity thereof). This output relay is directly driven by a collector of a transistor without passage through a transformer. However, in order to make it always possible to inspect whether or not the relay is turned on even in the absence of an instruction of turning on the contact output because of trouble in the driving transistor or fusion trouble of the contact, inspection is ordinarily performed by using, for example, a switch for reducing the relay-driving input to zero.

However, this inspection becomes insignificant if a trouble takes place during inspecting, and in order to ensure safety, the inspection should always be performed by an operator.

SUMMARY OF THE INVENTION

It is a primary object of the present invention to provide a load-driving circuit in which a load is directly driven without passage through a relay contact and a problem can be detected even if inspection is not frequently performed.

According to the load-driving switch circuit monitoring system of the present invention, an input signal Si is given with a fail-safe effect from a preceding step, and in principle, the conduction state or non-conduction state of a switching circuit turning on or off a driving circuit for an electrical load is detected by a load current detecting circuit, and occurrence of a trouble in the switch circuit is monitored by judging whether or not the detection signal is in agreement with the input signal Si.

However, it is very difficult to construct a system in which binary values of high voltage level "1" and low voltage level "0" are given to each of the input signal and load current detecting signal and whether or not these two values are in agreement with each other is discriminated by simple logical product operation means. Accordingly, in the present invention, input signal converting means and load current signal converting means are further arranged, and the binary input signal Si is converted by the input signal converting means to three values. That is, the binary input signal is converted to a predetermined a first voltage corresponding to the input signal Si turning on the switch circuit, a predetermined second voltage corresponding to the input signal Si turning off the switch circuit and a predetermined third voltage corresponding to a problem of the input signal converting means. These three voltages are put out, while the load current signal is converted by the load current signal converting means to three values, that is, a predetermined fourth voltage corresponding to the state where a load current flows, a predetermined fifth voltage corresponding to the state where a load current does not flow and a predetermined sixth voltage corresponding to a problem of the load current signal converting means and these three values are put out. Moreover, there is arranged fail-safe monitoring signal generating means in which the ternary outputs of the input signal converting means and the ternary outputs of the load current signal converting means are put in, and this fail-safe monitoring signal generating means is constructed so that when at least one of the condition that the first and fourth voltage signals are simultaneously put in and the condition that the second and fifth voltage signals are simultaneously put in is satisfied, an output of a voltage corresponding to a normal state is generated and under other conditions, an output of a voltage corresponding to an abnormal state is generated. By adoption of the above-mentioned structure, only two normal states, that is, the state in which there is an input signal Si and a load current flows and the state in which there is no input signal Si and no load current flows, are detected. In other states, it is judged that a problem takes place in the load-driving switch circuit or one of the two signal converting means and means necessary for avoiding a danger, such as interruption of the load current, is taken.

Furthermore, according to the load-driving switch circuit monitoring system of the present invention, occurrence of a problem in the input signal converting means or load current signal converting means as the means for converting binary values to ternary values is automatically monitored.

The load-driving switch circuit monitoring system of the present invention is further characterized in that each of the input signal converting means and load current signal converting means is provided with circuit means for overlapping a clamp voltage on the input signal voltage.

Moreover, each of the input signal converting means and load current signal converting means of the present invention may be constructed by a pair of voltage doubler rectifying means for generating positive and negative voltage signals.

Still further, the load-driving switch circuit monitoring system of the present invention may be constructed by two window comparators and logical addition means.

The present invention will now be described in detail with reference to embodiments illustrated in the accompanying drawings.

DETAILED DESCRIPTION OF THE PREFERRED EMBODIMENTS

Figure 1:
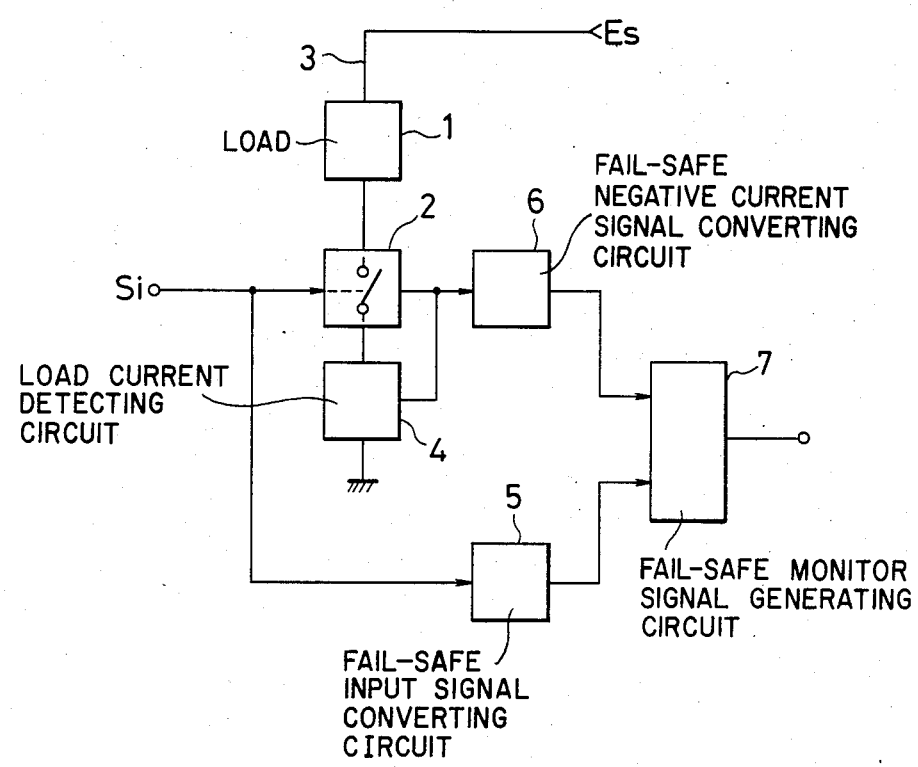
FIG. 1 is a block circuit diagram illustrating the basic structure of a monitoring system of the present invention.

FIG. 1 a block diagram showing the basic structure of the present invention. A load 1 is driven when a switch circuit 2 connected directly to a driving circuit 3 for the load 1 is palced in the ON state (conduction state) through the control by an input signal Si. Two values of high and low voltages of the input signal Si which are given by a preceding step with fail-safe property are put in the switch circuit 2 to turn on the switch circuit 2 (conduction) or turn off the switch circuit 2 (non-conduction). The switch circuit 2 is connected in series to the driving circuit 3 for the load 1 together with a load current detecting circuit 4 to perform on-off control of the electric current of the power source Es applied to the load 1.

The load current detecting circuit 4 detects the presence or absence of the load current flowing in the load 1 and generates a high voltage output when the load current flows, and moreover, the load current detecting circuit 4 generates a low voltage output with a fail-safe effect when the load current does not flow. The input signal Si and the binary signal of the load current detecting circuit 4 are converted to ternary output signals by a fail-safe input signal converting circuit 5 and a fail-safe negative current signal converting circuit 6, respectively. More specifically, the input signal converting circuit 5 puts out high voltage and low voltage signals corresponding to "on" and "off" signals of the input signal Si in the normal state respectively and puts out a third voltage signal at the time of a problem therein.

The load current signal converting circuit 6 puts out high voltage and low voltage signals corresponding to "on" and "off" signals of the load current detecting circuit 4 in the normal state respectively and puts out a third voltage signal at the time of a problem therein. A fail-safe monitor signal generating circuit 7 is arranged so that it monitors whether or not the ternary outputs of the load current signal converting circuit 6 are in agreement with the ternary outputs of the input signal converting circuit 5. In the case where the input signal converting circuit 5 and load current signal converting circuit 6 normally operate, when both the outputs of the circuit 5 and 6 are in agreement with each other, a high voltage output is generated by the circuit 7 and when both the outputs are not in agreement with each other, a low voltage output is generated by the circuit 7. In the case where at least one of the input signal converting circuits 5 and the load current signal converting circuit 6 is out of order, a trouble signal of the third voltage is put in each of the monitor signal generating circuit 7 and a low voltage output is generated by the circuit 7.

As is apparent from the foregoing description, according to the present invention, the presence or absence of the input signal and the presence or absence of the load current are monitored based on the agreement or disagreement between the signals obtained by conversion. Accordingly, both states where the load current flows even in the absence of the input signal and where the load current does not flow even in the presence of the input signal are detected, and occurrence of a problem in the load-driving switch circuit can be detected assuredly, so that the power source may be forcibly interrupted by an information of this detection.

It is apprehended that the condition of the agreement between the above-mentioned conversion signals of the input signal and load current signal will be satisfied even when a problem takes place in the input signal converting circuit 5 or load current signal converting circuit 6. In order to avoid this disadvantage, there may be adopted a structure in which special third voltage signals are put out from the converting circuits 5 and 6 when problem occurred in the converting circuits 5 and 6. If at least one of these problem signals is put in the monitor signal generating circuit 7, it is judged that a circuit problem occurs in at least one of the converting circuits 5 and 6, and the power source is forcibly interrupted. Accordingly, as compared with the case where the load is directly driven by the switch circuit, this structure of the present invention is advantageous in that a fail-safe effect can be attained in any cases and the load can be directly controlled by the input signal.

Furthermore, since the load can be directly controlled by the input signal, the structure between the input signal and the load can be significantly simplified and the circuit efficiency can be increased.

Figure 2:
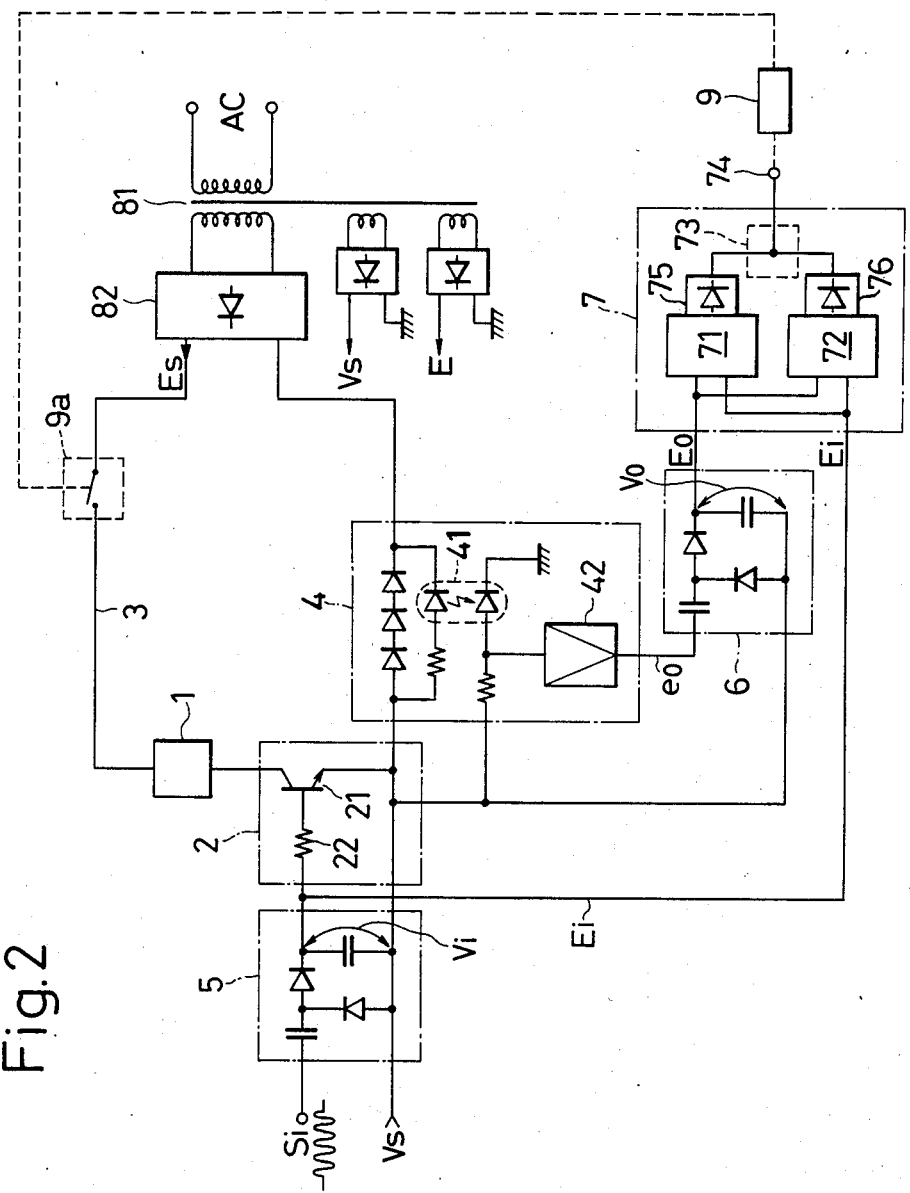
FIG. 2 is a circuit diagram illustrating a first embodiment of the present invention.

FIG. 2 shows a first embodiment of the monitoring system of the present invention. In this first embodiment, the ripple component contained in the direct current power source Es is utilized for detecting the presence or absence of the load current. Moreover, in this embodiment, as means for converting the binary values to ternary values, there is adopted a method in which the binary values are converted to the following ternary values, that is, the base voltage Vs as well as the sum of Vs and the signal voltage corresponding to the "on" or "off" state of the input signal Si and the switch circuit 2, and the problem signal voltage.

The switch circuit 2 for driving an electric load 1 comprises a transistor 21 connected in series in a driving circuit 3 together with the power source Es and the load 1 (a thyristor or photocoupling thyristor may be used instead, however in this embodiment, the transistor is shown for facilitating the understanding). The load current detecting circuit 4 for detecting the presence or absence of a load current comprises a photocoupler 41 for receiving a light emitted when a current is produced in the load and an alternating current amplifier 42 for amplifying an alternating current signal put out from the photocoupler 42. The power sources Es and Vs are different power sources taken out from different insulated coils of a transformer 81 and rectified by a rectifying circuit 82.

The input signal Si is given to the base of the transistor 21 of the switch circuit 2 through the input signal converting circuit 5 (ordinarily, in the switch circuit 2, the input signal is insulated from a switch element by a photocoupler or the like, which is indicated by a resistor 22 in FIG. 2). By this input signal Si, the transistor 21 is turned on (conduction state) and the load 1 is driven. While the transistor 21 is kept in the "off" state, that is, no electric current is flows in the load 1, the photocoupler 41 does not emit any light, and hence, the output Eo of the load current detecting circuit 4 is zero. On the other hand, when an electric current flows in the load 1, the photocoupler 41 receives a pulsating light emitted by the ripple component of the power source voltage Es, and the alternating current output Eo is obtained in the load current detecting circuit 4. Incidentally, the input signal Si is ordinally supplied from the circuit of the precedent stage as a fail-safe signal (the signal voltage becomes zero when a problem takes place on the input side).

The input signal converting circuit 5 for effecting the binary-to-ternary conversion of the input signal Si is constructed by a known voltage doubler half-wave rectifying circuit in which the input signal Si is put in one input terminal thereof and the base voltage Vs is put out as the clamp voltage in the other input terminal thereof, and the output value of this circuit 5 is one obtained by overlapping the input voltage on the clamp voltage Vs. Accordingly, in the case where there is input signal Si, the output Ei of this circuit is equal to Vs, and in the case where there is the input signal Si, the output Ei is equal to the sum of Vs and the rectifying voltage Vi of the input signal Si. In case a problem occurred in the signal converting circuit 5, such as a trouble of $Vs=0$, a trouble signal output of $Ei=0$ is obtained, and thus, the binary-to-ternary conversion is accomplished.

The load current signal converting circuit 6 for effecting the binary-to-ternary conversion of the presence or absence of the load current has a circular structure similar to that of the input signal converting circuit 5. In the case where there is not the output eo of the load current detecting circuit 4, the output Eo of the circuit 6 is equal to Vs, and in the case where there is present the output eo, the output Eo is equal to $Vs+Vo$ in which Vo stands for the rectifying voltage of the output eo. In case of a problem, such as a trouble of $Vs=0$, the output Eo becomes equal to zero or Vo ($>Vs$) and thus, the binary-to-ternary conversion is accomplished.

The monitor signal generating circuit 7 comprises two-inputs type window comparators 71 and 72 described below and a wired OR circuit 73. The first window comparator 71 oscillates only when input conditions of $Ei=Vs+Vi$ and $Eo=Vs+Vo$ are satisfied, and in this case, the first window comparator puts out a high voltage output. More specifically, the above two conditions indicate the normal state where there are present the input signal Si and the load current flow. The second window comparator 72 oscillates and generates a high voltage output only when input conditions of $Ei=Vs$ and $Eo=Vs$ are satisfied. The conditions indicate the normal state where there is not present the input signal and the load current is not produced. Under other conditions, each of the window comparators does not cause oscillation and is in a low voltage output.

In connection with the relation between the input signal Si and the output eo of the load current detecting circuit 4, it is considered that there are the following four cases.

(i) There is no output voltage eo when there is no input signal Si.
(ii) There is an output voltage eo when there is an input signal Si.
(iii) There is an output voltage eo where there is no input signal Si.
(iv) There is no output eo when there is an input signal Si.

Of the above-mentioned four cases (i) through (iv), it is in the cases (i) and (ii) that the switch circuit normally acts, and in the cases (iii) and (iv), any problem takes place in the switch circuit 2 with reference to the input signal Si. Accordingly, if the cases (iii) and (iv) are detected, occurrence of a circuit problem can be detected. As a result, the load current can be manually or automatically intercepted according to the present invention when problems inclusive of a problem of this detecting circuit take place.

In the state (i), there is not present the input signal Si and there is not present the output eo of the load current detecting circuit 4 (the load current does not flow). Accordingly, the conversion output Vi of the input signal converting circuit 5 is equal to Vs and the conversion output Eo of the load current signal converting circuit 6 is equal to Vs. Under these input conditions of $Ei=Vs$ and $Eo=Vs$, the second window comparator 72 in the monitor signal generating circuit 7 oscillates, and a high voltage output formed by rectifying this oscillation output by the rectifier 75 is generated on the output terminal 74 through the wired OR circuit 73.

In the state (ii), there is present the input signal Si and there is present the output eo of the load current detecting circuit 4 (the load current flows). Accordingly, the conversion output Ei of the input signal converting circuit 5 is equal to the sum of Vs and Vi and the conversion output Eo of the load current signal converting circuit 6 is equal to the sum of Vs and Vo. Under these input conditions, the first window comparator 71 in the monitor signal generating circuit 7 oscillates and a high voltage output formed by rectifying this oscillation output is generated on the output terminal 74 through the wired OR circuit 73. Accordingly, in the case where a high voltage output is generated on the output terminal 74 of the monitor signal generating circuit 7, the switch circuit 2 performs a normal action.

In the state (iii), though there is not present the input signal Si, there is present the output eo of the load current detecting circuit 4 (the load current flows). Accordingly, the conversion output of the input signal converting circuit 5 is equal to Vs and the conversion output Eo of the load current signal converting circuit 6 is equal to the sum of Vs and Vo. These two conversion outputs Ei and Eo are fed to the monitor signal generating circuit 7, but the oscillation conditions for the window comparators 71 and 72 are not satisfied. Therefore, the window comparators 71 and 72 are inhibited from oscillation and a low voltage is generated on the output terminal 74.

In the state (iv), although there is present the input signal Si, there is not present the output eo of the load current detecting circuit 4 (the load current does not flow). Accordingly, the conversion input Ei of the input signal converting circuit 5 is equal to the sum of Vs and Vi and the conversion output Eo of the load current signal converting circuit 6 is equal to Vs. These two conversion outputs Ei and Eo are fed to the monitor signal generating circuit 7, but as in the case (iii), the oscillation conditions for the window comparators 71 and 72 are not satisfied. Therefore, the window comparators 71 and 72 are inhibited from oscillation and a low voltage output is generated on the output terminal 74.

Accordingly, in the case where a low voltage is generated on the output terminal 74 of the monitor signal generating circuit 7, it is indicated that any problem takes place in the switch circuit 2 and malfunction is performed.

Incidentally, if the input signal converting circuit 5 and load current signal converting circuit 6 are removed from the circuit shown in FIG. 2 and the substantial agreement or disagreement between the input signal Si and the load current output eo is monitored by the remaining circuit, in case of an ordinary AND circuit, a high voltage output does not appear in the above-mentioned state (ii) and a low voltage output is generated as in the cases (iii) and (iv). Therefore, discrimination of the state (ii) from the states (iii) and (iv) becomes impossible. Accordingly, in the present embodiment, the two window comparators 71 and 72 are arranged so that a high voltage output is generated when the input signal Si is in agreement with the load current output, whereby the state (ii) can be discriminated from the states (iii) and (iv). Since the window comparators 71 and 72 are constructed so that they are caused to oscillate by two inputs of a predetermined voltage, the input signal converting circuit 5 and load current signal converting circuit 6 are arranged in the above-mentioned manner, and the on-off signals of these circuits are converted to binary values and are put in the corresponding window comparators 71 and 72 to be effective to oscillate. Accordingly, problems of these input signal converting circuit 5 and load current signal converting circuit 6 per se should also be taken into consideration. The reason is that if a problem takes place on at least one of the converting circuits 5 and 6 and the output of the problem-occurring circuit 5 or 6 is erroneous within the oscillation input voltage of the corresponding window comparator 71 or 72, an output of an unexpected voltage is put out from the window comparator 71 or 72, and then the above-mentioned normal monitoring action is rendered impossible. Accordingly, each of the input signal converting circuit 5 and load current signal converting circuit 6 is constructed as a binary-to-ternary converting unit in which a voltage output indicating a trouble and not acting as an oscillation signal for the window comparator 71 or 72 is generated at the time of a trouble of this converting unit, and when this problem outlet is produced, the window comparator 71 or 72 generates a low voltage output not causing oscillation. Accordingly, the window comparator 71 or 72 output an oscillation stopping signal so as to indicate occurrence of a trouble.

Accordingly, the load 1 can be driven with a fail-safe effect if a monitor relay 9 or the like is driven by the output of the monitor signal generating circuit 7 and when the relay 9 falls down (de-energized), the driving circuit 3 is forcibly intercepted by a contact 9a of the relay 9 or a warning signal is displayed by using this contact.

Figure 3:
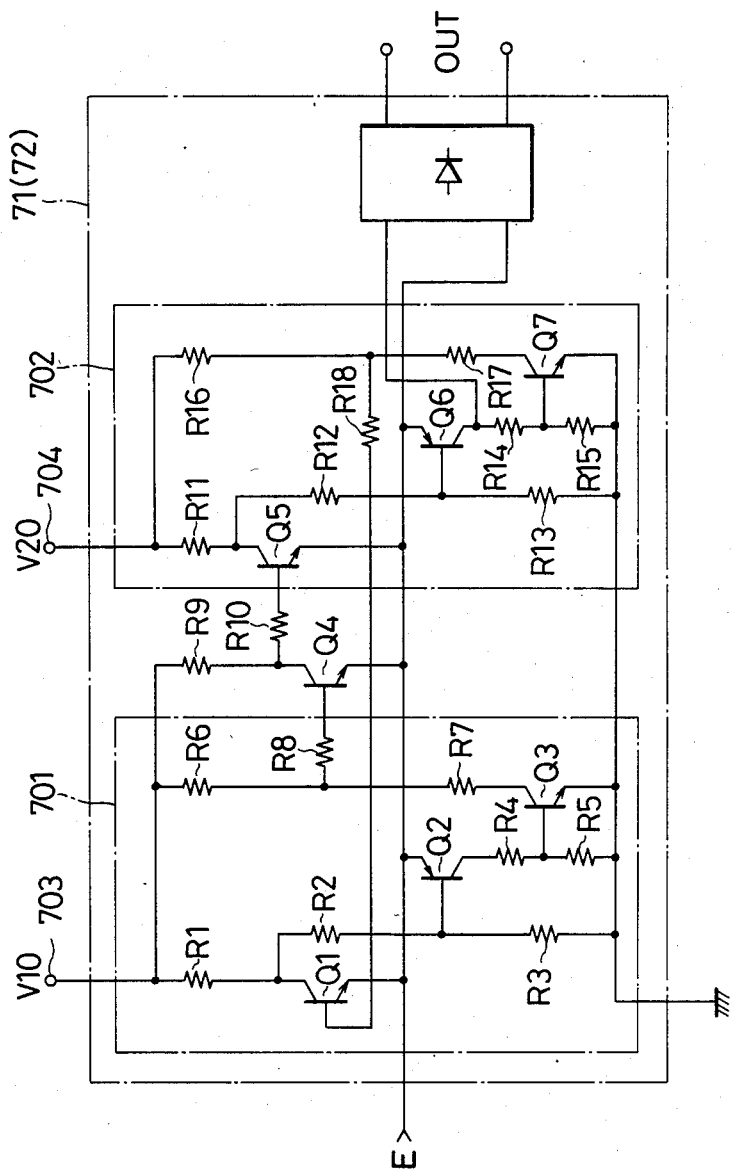
FIG. 3 is a circuit diagram illustrating an example of a monitor signal-generating circuit in the embodiment shown in FIG. 1.

FIG. 3 is a diagram illustrating a specific example of the circuit of the window comparator 71 (or 72) constituting the monitor signal generating circuit 7 shown in FIG. 2. The illustrated example is constructed by a 2-input window comparator ("AND" logic operation oscillator) proposed by us in Japanese Utility Model Application Laid-Open Specification No. 57-4764. This circuit will now be described in brief. Transistors Q1, Q2 and Q3 constitute a first transistor amplification delay circuit 701 and transistors Q5, Q6 and Q7 constitute a second transistor amplification delay circuit 702, and these two circuits 701 and 702 are connected through a transistor Q4 and a feedback loop is formed between them through a resistor 18, whereby a logical product operation oscillator which oscillates by inputs on input terminals 703 and 704 is constructed. The oscillation condition (generally called "window of a window comparator") is such that oscillation is caused only when the following conditions are satisfied:

$$\frac{E(R1 + R2 + R3)}{R13} < V10 < \frac{E(R6 + R7)}{R7}$$

and $$\frac{E(R11 + R12 + R13)}{R13} < V20 < \frac{E(R16 + R17)}{R17}$$

wherein V10 stands for the input voltage on the input terminal 703 and V20 stands for the input voltage on the input terminal 704.

Accordingly, if the oscillation condition of this comparator is appropriately adjusted, it becomes possible to oscillate the first window comparator 71 only in case of $V10=Vs+Vi$ and $V20=Vs+Vo$ and to oscillate the window comparator 72 only in case of $V10=Vs$ and $V20=Vs$. If the type of the transistors shown in FIG. 3 is changed from PNP to NPN, there can be constructed a window comparator which oscillates under power source and input voltage conditions of $E<0$, $V10<0$ and $V20<0$.

In order to perform operations with a fail-safe effect, it is necessary to impart fail-safe characteristics to the input signal converting circuit 5, the load current detecting circuit 4 and the load current signal converting circuit 6. In the embodiment illustrated in FIG. 2, each of the input signal converting circuit 5 and load current signal converting circuit 6 is a binary-to-ternary conversion circuit including a voltage doubler half-wave rectifying circuit (known as a fail-safe circuit utilizing a smoothing capacitor comprising a rotary terminal). Accordingly, each of the circuits 5 and 6 has essentially a fail-safe effect. Furthermore, the load current detecting circuit 4 performs an alternating current operation (known as fail-safe amplifying means) by utilizing an optical transducer (or photocoupler) and an alternating current amplifier, therefore the operation of the circuit 4 has a fail-safe effect.

Figure 4:
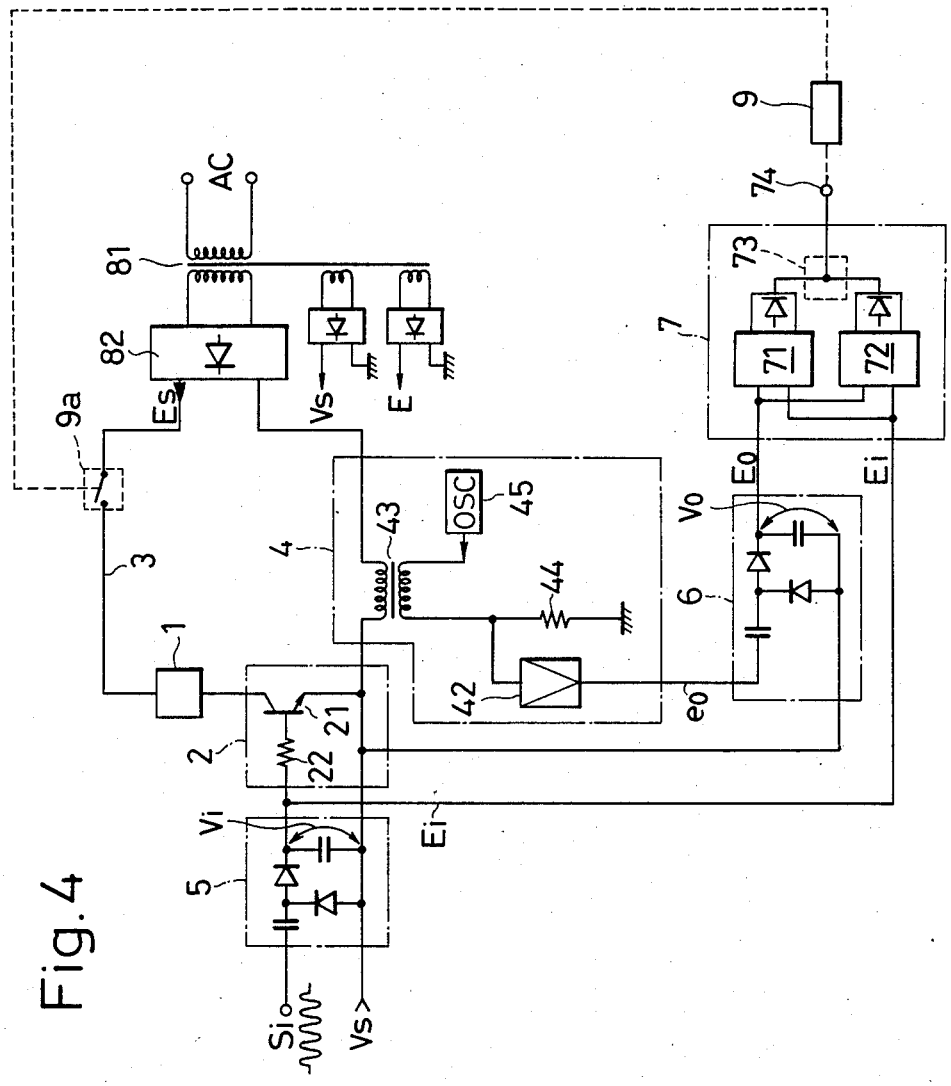
FIG. 4 is a circuit diagram illustrating a second embodiment of the present invention.

FIG. 4 illustrates a second embodiment of the present invention in which a ripple component is not substantially contained in the direct current power source voltage Es. In the case where any ripple component is contained in the power source voltage, even if the photocoupler 41 is directly connected to the load current as shown in FIG. 2, it is impossible to take out an alternating current signal. Accordingly, an oscillator 45 is connected to a resistor 44 (which may be interpreted as representing the input resistor of an amplifier 42) through a transformer 43, and an output of the oscillator 45 is produced between terminals of the resistor 44 according to the presence or absence of the load current. The oscillation output is taken out as an output of the amplifier 42. Namely, when a direct current of the load does not flow in the transformer 43, since the impedance of the coil on the side of the oscillator 45 is high, the oscillation output between the terminals of the resistor 44 is small. However, when the direct load current flows, the trasformer 43 is saturated and the impedance gets lower, and therefore, the output of the oscillator 45 directly appears between the terminals of the resistor 44. Accordingly, it is sufficient if the output obtained by rectifying the output of the amplifier 42 is used as the output eo. Other structural features are the same as in the embodiment shown in FIG. 2.

Figure 5:
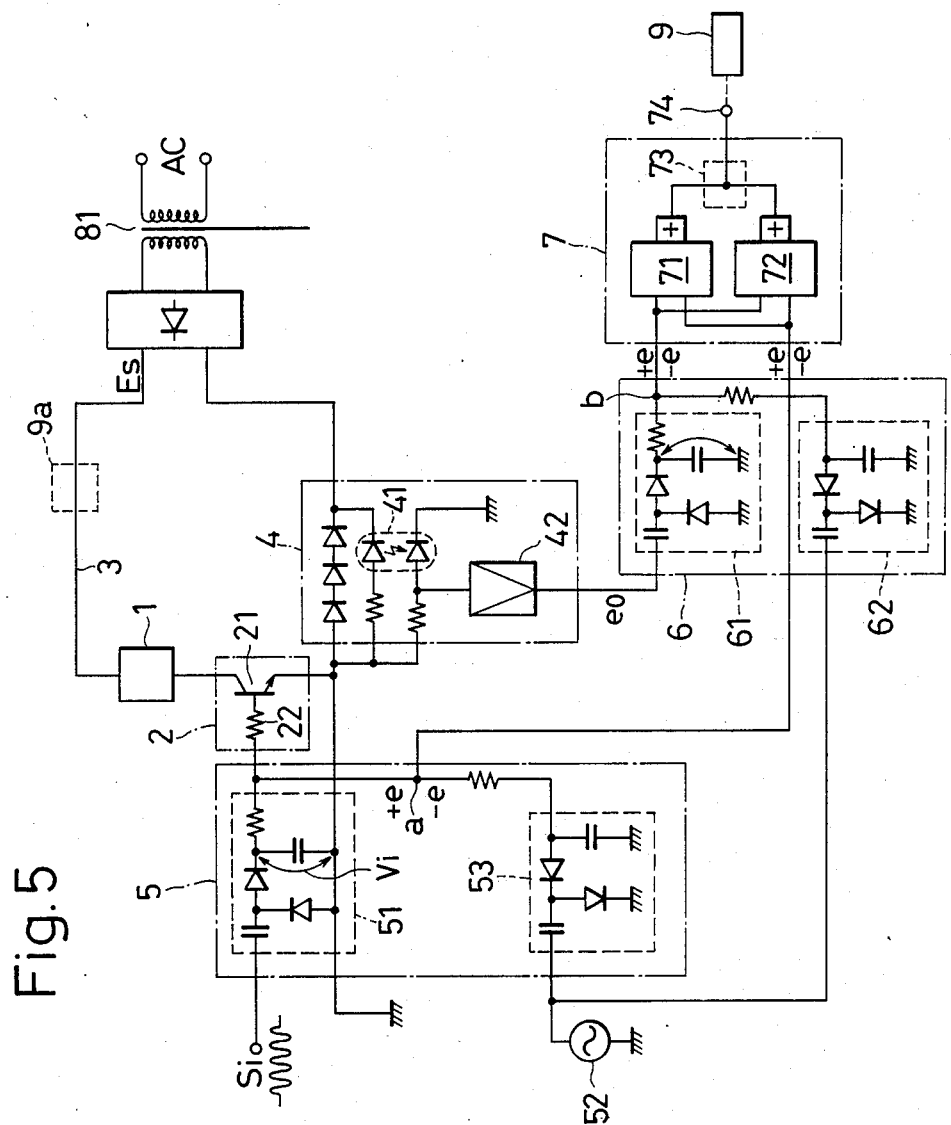
FIG. 5 is a circuit diagram illustrating a third embodiment of the present invention.

FIG. 5 illustrates a third embodiment of the present invention in which a method for converting the binary values to a zero volt value, a positive volt value and a negative volt value is adopted as the binary-to-ternary conversion method. The input signal converting circuit 5 comprises a voltage doubler rectifier 51 generating a positive direct current voltage according to the input signal Si and a voltage doubler rectifying circuit 53 which always rectifies an oscillation output of an oscillator 52 and generates a negative direct current voltage. Accordingly, a voltage difference between both the voltages appears at a connecting point between the two outputs of the rectifying circuits 51 and 53. More specifically, in the case where there is not present the input signal Si, the voltage at the point a is a negative voltage, and in the case where there is present the input signal Si, a positive voltage appears at the point a by means of suitable selection of the voltage Vi. The positive and negative voltages appearing at the point a are designated as "−e" and "+e" for simplification of the explanation. Similarly, the load current signal converting circuit 6 comprises a voltage double rectifying circuit 61 generating a positive direct current voltage and a voltage doubler rectifying circuit 62 generating a negative direct current voltage. Accordingly, a voltage difference between both the voltages appears at a connecting point b between the two output of the voltage doubler rectifying circuits 61 and 62. Namely, if there is not present the output eo of the load current detecting circuit 4, a negative voltage appears at the point b and if there is the output eo, a positive voltage appears at the point b. The positive and negative voltages appearing at the point b are designated as "−e" and "+e" for simplification of the explanation.

In the above-mentioned structure, in case of the aforementioned state (i), −e appears at the point a and −e appears at the point b, in the state (ii) +e appears at the point a and +e appears at the point b, in the state (iii) −e appears at the point a and +e appears at the point b, and in the state (iv) +e appears at the point a and −e appears at the point b. Accordingly, in order to detect the states (iii) and (iv), it is sufficient if the condition for oscillation of the first window comparator 71 of the monitor signal generating circuit 7 is set as two inputs +e and +e and the condition for oscillation of the second window comparator 72 is set as two inputs −e and −e.

Figure 6:
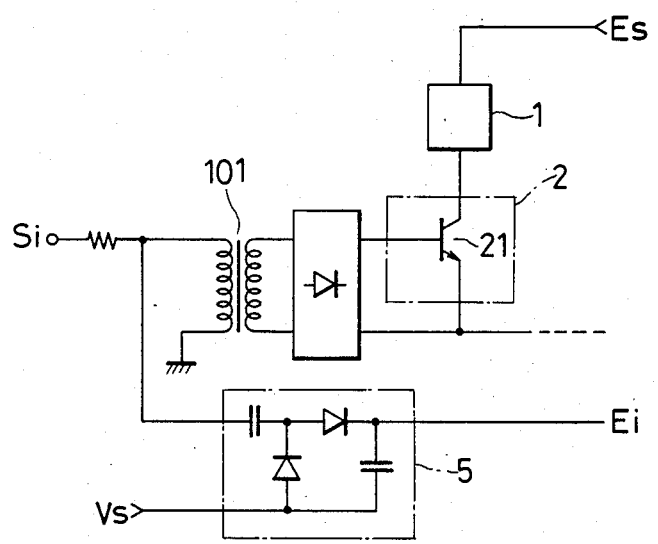
FIG. 6 is a circuit diagram illustrating a fourth embodiment of the present invention.

More specifically, in the circuit shown in FIG. 3, if the type of the transistor 2 is changed from PNP to NPN and a negative power source is used, in the above-mentioned case (iii) or (iv) one of the window comparators 71 and 72 is not allowed to oscillate, and the output of the monitor signal generating circuit 7 is at a low voltage level as in the embodiment shown in FIG. 2. Accordingly, while the monitoring relay 9 or the like is driven by the monitor signal generating circuit 7, when the monitoring relay 9 falls, the power source Es is forcibly intercepted at the contact 9a of the relay 9 or a warning signal or the like is displayed by utilizing this relay 9. If this arrangement is adopted, it becomes possible to drive the load 1 with a fail-safe effect. Incidentally, it will be obvious to those skilled in the art that even if the relation of the rectifying outputs +e and −e is reversed, the above-mentioned fail-safe driving of the load can be accomplished. Of course, the input side of the transistor 21 (the input circuit for the switch circuit) in the embodiments shown in FIGS. 2, 4 and 5 may be insulated by a transformer 101 as shown in FIG. 6.

in connection with the trouble signal of the input signal converting circuit 5, the voltage at the point a becomes zero if a trouble takes place in one voltage doubler rectifying circuit 53, and the voltage at the point a becomes −e if a trouble takes place in the other voltage doubler rectifying circuit 51. The 0 volt signal is a third voltage signal which is different from either +e or −e and this voltage is outside the range of the conditions for oscillating the window comparators 71 and 72 and exerts a fail-safe effect. In the case where the load current signal converting circuit 5 normally operates, generation of the signal −e indicates that the load current does not flow. In this case, even though the common signal −e is put in the window comparator 72 and oscillation is caused to put out a high voltage lovel signal, a fail-safe effect can be attained because the load current does not flow.

The trouble signals of the load current signal converting circuit 6 are 0 and −e. Of these trouble signals, the zero volt signal is a fail-safe signal because it does not oscillate the window comparators 71 and 72 as pointed out above. It is when a problem takes place in one voltage doubler rectifying circuit 61 that the signal −e is generated from the circuit 6, and it is when there is not present the input signal Si that the output signal −e is generated from the input signal converting circuit 5. Hereupon, the case where the switch circuit 2 is short-circuited and the load current is generated even in the absence of the input signal Si becomes an issue. However, it seldom happens that problems simultaneously occur at two points. Moreover, since a fail-safe structure is adopted, a primary problem is ordinarily repaired by utilizing the quick response characteristic of the primary problem before a secondary problem actually takes place.

Also in the case where both the voltage doubler rectifiers 51 and 61 get out of order, output signals −e are generated from both the input signal converting circuit 5 and the load current signal converting circuit 6, but ordinarily, it may be considered that it does not happen that both the circuits 5 and 6 simultaneously get out of order.

In the foregoing embodiments, the transistor is adopted as the switching element. However, it will readily be understood that a thyristor or a transistor or thyristor having a photocoupler arranged in the input side may be used instead of the transistor in FIG. 2. For example, if the base of the transistor shown in FIG. 2 is connected to a gate of a thyristor, the emitter is connected a cathode and the collector is connected to an anode, the same function can be exerted. Moreover, if the rectifying circuit on the output side of the transformer 101 is omitted in FIG. 6 and a bidirectional thyristor is used instead of the transistor as in the above-mentioned case, alternating switching can be performed and apparently, the bidirectional thyristor can be monitored by the circuit shown in FIG. 5.

I claim:

1. A monitoring system, which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions.

2. A monitoring system for load-driving switch circuits according to claim 1, wherein said switch circuit is a semiconductor output switching element such as a transistor or a thyristor.

3. A monitoring system for load-driving switch circuits according to claim 1, wherein said switch circuit is a composite switch element such as a photocoupling thyristor.

4. A monitoring system for load-driving switch circuits according to claim 1, wherein said load current detecting means comprises photocoupling means for emitting light or stopping the light emission and receiving light according to the presence or absence of the load current.

5. A monitoring system which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions, said load current detecting means comprising photocoupling means for emitting light or stopping the light emission and receiving light according to the presence or absence of the load current, wherein said load current detecting means comprises photocoupling means and means for rectifying an alternating output of said photocoupling means and putting out a rectified output.

6. A monitoring system which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions,
said load current detecting means comprising means in which a secondary coil of a transformer is connected in series to a resistor between an oscillator and the ground, a primary coil of the transformer is directed in series to said load-driving circuit and a terminal voltage of the resistor is put out through rectifying means.

7. A monitoring system which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions,
said input signal converting means comprising a circuit for superimposing a clamp voltage on the voltage of the input signal Si and putting the superimposed voltage, and said load current signal converting means comprises a circuit for superimposing a clamp voltage on a voltage of an input signal eo from said load current detecting means and putting out the superimposed voltage.

8. A monitoring system which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions,
said input signal converting means comprising first voltage doubler rectifying means for generating a positive direct current voltage according to the input signal Si, first oscillating means and second voltage doubler rectifying means for rectifying an oscillation output of said first oscillating means to a negative direct current voltage and putting out said negative direct current voltage and said input signal converting means comprising means for computing a voltage difference between two outputs of said first and second voltage doubler rectifying means and putting out said voltage difference, and said load current signal converting means comprises third voltage doubler rectifying means for generating a positive direct current voltage according to an input signal eo from said load current detecting means, second oscillating means and fourth voltage doubler rectifying means for rectifying an oscillation output of said oscillating means to a negative direct current voltage and putting out said negative direct current voltage and said load current signal converting means comprising means for computing a voltage difference between two outputs of said third and fourth voltage doubler rectifying means and putting out said voltage difference.

9. A monitoring system which comprises a circuit which drives an electric load, a switch circuit performing on-off control of said driving circuit on receipt of an input signal Si consisting of two different voltages, fail-safe input signal converting means for converting said input signal Si of the two voltages to a predetermined first voltage corresponding to the value of the input signal Si turning on said switch circuit, a predetermined second voltage corresponding to the value of the input signal Si turning off said switch circuit and a predetermined third voltage corresponding to a problem of said input signal converting means itself and putting out said three voltages, fail-safe load current detecting means for detecting a load current in said driving circuit and generating two different voltages corresponding to the flow state and non-flow state of said load current, respectively, fail-safe load current signal converting means for converting the two different voltage inputs from said load current detecting means to a predetermined fourth voltage corresponding to the flow state of the load current, a predetermined fifth voltage corresponding to the non-flow state of the load current and predetermined sixth voltage corresponding to a problem of said load current signal means itself and putting out said three voltages, and fail-safe monitor signal generating means, in which said three output voltages of said input signal converting means and said three output voltages of said load current signal converting means are put and which generates a voltage output corresponding to the normal state only when at least one of the condition that the first and fourth voltage signals are simultaneously put in and the condition that the second and fifth voltage signals are simultaneously put in is satisfied and generates a voltage output corresponding to the abnormal state under other conditions, said monitor signal generating means comprising first and second window comparators in which output signals of said input signal converting means and load current signal converting means, respectively, and computing means for logical addition of outputs of said two window comparators, said first window comparator is kept in a high voltage output state when the first voltage output of said input signal converting means and the fourth voltage output of said load current signal converting means are simultaneously put in said first window comparator, said second window comparator is kept in a high votage output stage when the second voltage output of said input signal converting means and the fifth voltage output of said load current signal converting means are simultaneously put in the second window comparator, and when other outputs are put in said first and second window comparators, both of said first and second window comparators are kept in a low voltage output stage.

* * * * *